United States Patent
Krill et al.

(10) Patent No.: US 8,467,641 B2
(45) Date of Patent: Jun. 18, 2013

(54) SYSTEM AND METHOD FOR USING PLANAR DEVICE TO GENERATE AND STEER LIGHT BEAM

(75) Inventors: Jerry A. Krill, Fulton, MD (US); Stergios J. Papadakis, Ellicott City, MD (US); Michael C. Gross, Montgomery Village, MD (US); Gerald F. Ricciardi, Mount Airy, MD (US); Joe Frank, Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 220 days.

(21) Appl. No.: 13/047,379

(22) Filed: Mar. 14, 2011

(65) Prior Publication Data
US 2011/0222814 A1 Sep. 15, 2011

Related U.S. Application Data

(60) Provisional application No. 61/313,167, filed on Mar. 12, 2010.

(51) Int. Cl.
*G02B 6/26* (2006.01)
(52) U.S. Cl.
USPC .............................................. 385/22; 385/17
(58) Field of Classification Search
USPC ..................................................... 385/17, 22
See application file for complete search history.

(56) References Cited

U.S. PATENT DOCUMENTS

| 4,939,682 | A | * | 7/1990 | Falk .............................. 708/191 |
| 5,544,268 | A | * | 8/1996 | Bischel et al. .................... 385/4 |
| 5,614,686 | A | * | 3/1997 | Van Duyne et al. ............ 84/622 |
| 5,724,463 | A | | 3/1998 | Deacon et al. |
| 5,751,248 | A | | 5/1998 | Thaniyavarn |
| 6,128,421 | A | | 10/2000 | Roberts |
| 6,167,169 | A | | 12/2000 | Brinkman et al. |
| 6,731,834 | B2 | * | 5/2004 | DeAngelis et al. ............. 385/17 |
| 6,768,458 | B1 | | 7/2004 | Green et al. |
| 7,260,286 | B2 | | 8/2007 | Gu et al. |
| 7,671,687 | B2 | | 3/2010 | LeChevalier |
| 2002/0054727 | A1 | * | 5/2002 | Song ............................... 385/17 |
| 2002/0172463 | A1 | * | 11/2002 | Romanovsky ................. 385/37 |
| 2004/0240818 | A1 | * | 12/2004 | Laskowski et al. ........... 385/126 |

* cited by examiner

*Primary Examiner* — Charlie Peng
(74) *Attorney, Agent, or Firm* — Noah J. Hayward (57) ABSTRACT

The present invention provides a device is provided for use with a first through fourth light beams. The device includes a first through fourth waveguides and first through fourth light scattering portions. The first waveguide has a length and a width and is arranged to receive the first light beam, wherein the length is larger than the width. The second waveguide is parallel with the first waveguide and is arranged to receive the second light beam. The third waveguide is disposed perpendicularly to and intersecting with the first waveguide and the second waveguide. The third waveguide is arranged to receive the third light beam. The fourth waveguide is parallel with the third waveguide and is disposed perpendicularly to and intersecting with the first waveguide and the second waveguide. The fourth waveguide is arranged to receive the fourth light beam. The first light scattering portion is disposed at the intersection of the first waveguide and the third waveguide. The second light scattering portion is disposed at the intersection of the second waveguide and the third waveguide. The third light scattering portion is disposed at the intersection of the first waveguide and the fourth waveguide. The fourth light scattering portion is disposed at the intersection of the second waveguide and the fourth waveguide. The light scattering portions can scatter light normal to the waveguides.

17 Claims, 6 Drawing Sheets

SYSTEM AND METHOD FOR USING PLANAR DEVICE TO GENERATE AND STEER LIGHT BEAM

The present application claims priority from U.S. Provisional Application No. 61/313,167 filed Mar. 12, 2010, the entire disclosure of which is incorporated herein by reference.

BACKGROUND

The present invention relates to optical beam steering systems.

Precise and controllable delivery of coherent light or other guided modes to a desired location is an important topic, with telecommunications, military, and other general industrial applications. Conventional ways of obtaining such delivery is the use of large (i.e. macroscopic) mechanically controlled mirrors. While this technology is mature, it is limited by the mechanical nature of mirror movement. Inertial properties of mechanically driven mirrors limit the speed with which steering direction can be changed. The other well-established beam steering device, the acousto-optic modulator, has a severely limited angular range, and a very different physical form factor.

What is needed is a system and method for creating a steerable beam of coherent light without mechanically moving parts.

BRIEF SUMMARY

The present invention provides is a system and method for creating a steerable beam of coherent light without mechanically moving parts.

In accordance with an aspect of the present invention, a device is provided for use with first through third light beams. The device includes first through fourth waveguides and first through fourth light scattering portions. The first waveguide has a length and a width and is arranged to receive the first light beam, wherein the length is larger than the width. The second waveguide is parallel with the first waveguide, has the length and width, and is arranged to receive the second light beam. The third waveguide is disposed perpendicularly to and intersecting with the first waveguide and the second waveguide. The third waveguide has the length and width and is arranged to receive the third light beam. The fourth waveguide is parallel with the third waveguide and is disposed perpendicularly to and intersecting with the first waveguide and the second waveguide. The fourth waveguide has the length and width and is arranged to receive the fourth light beam. The first light scattering portion is disposed at the intersection of the first waveguide and the third waveguide. The first light scattering portion can scatter light into a direction normal to the length of the first waveguide and normal to the length of the third waveguide. The second light scattering portion is disposed at the intersection of the second waveguide and the third waveguide. The second light scattering portion can scatter light into a direction normal to the length of the second waveguide and normal to the length of the third waveguide. The third light scattering portion is disposed at the intersection of the first waveguide and the fourth waveguide. The third light scattering portion can scatter light into a direction normal to the length of the first waveguide and normal to the length of the fourth waveguide. The fourth light scattering portion is disposed at the intersection of the second waveguide and the fourth waveguide. The fourth light scattering portion can scatter light into a direction normal to the length of the second waveguide and normal to the length of the fourth waveguide.

In accordance with an aspect of the present invention, a device is provided for use with first through sixth light beams. The device includes first through sixth waveguides and first through ninth scattering portions. The first waveguide has a length and a width and is arranged to receive the first light beam, wherein the length is larger than the width. The second waveguide is parallel with the first waveguide. The second waveguide has the length and width and is arranged to receive the second light beam. The third waveguide is parallel with the first waveguide. The third waveguide has the length and width and is arranged to receive the third light beam. The fourth waveguide is disposed perpendicularly to and intersecting with the first waveguide, the second waveguide and the third waveguide. The fourth waveguide has the length and width and is arranged to receive the fourth light beam. The fifth waveguide is parallel with the fourth waveguide and disposed perpendicularly to and intersecting with the first waveguide, the second waveguide and the third waveguide. The fifth waveguide has the length and width and is arranged to receive the fifth light beam. The sixth waveguide is parallel with the fifth waveguide and is disposed perpendicularly to and intersecting with the first waveguide, the second waveguide and the third waveguide. The sixth waveguide has the length and width and is arranged to receive the sixth light beam. The first light scattering portion is disposed at the intersection of the first waveguide and the fourth waveguide. The first light scattering portion can scatter light into a direction normal to the length of the first waveguide and normal to the length of the fourth waveguide. The second light scattering portion is disposed at the intersection of the second waveguide and the fourth waveguide. The second light scattering portion can scatter light into a direction normal to the length of the second waveguide and normal to the length of the fourth waveguide. The third light scattering portion is disposed at the intersection of the third waveguide and the fourth waveguide. The third light scattering portion can scatter light into a direction normal to the length of the third waveguide and normal to the length of the fourth waveguide. The fourth light scattering portion is disposed at the intersection of the first waveguide and the fifth waveguide. The fourth light scattering portion can scatter light into a direction normal to the length of the first waveguide and normal to the length of the fifth waveguide. The fifth light scattering portion is disposed at the intersection of the second waveguide and the fifth waveguide. The fifth light scattering portion can scatter light into a direction normal to the length of the second waveguide and normal to the length of the fifth waveguide. The sixth light scattering portion is disposed at the intersection of the third waveguide and the fifth waveguide. The sixth light scattering portion can scatter light into a direction normal to the length of the third waveguide and normal to the length of the fifth waveguide. The seventh light scattering portion is disposed at the intersection of the first waveguide and the sixth waveguide. The seventh light scattering portion can scatter light into a direction normal to the length of the first waveguide and normal to the length of the sixth waveguide. The eighth light scattering portion is disposed at the intersection of the second waveguide and the sixth waveguide. The eighth light scattering portion can scatter light into a direction normal to the length of the second waveguide and normal to the length of the sixth waveguide. The ninth light scattering portion is disposed at the intersection of the third waveguide and the sixth waveguide. The ninth light scattering portion can scatter light into a direction normal to the length of the third waveguide and normal to the length of the sixth waveguide. The first waveguide is spaced from the second waveguide by a first distance $d_1$. The third waveguide is spaced from the second waveguide by a second distance $d_2$, where $d_1 \neq d_2$.

In accordance with an aspect of the present invention, a method is provided for driving a device arranged to receive first through fourth light beams, wherein the device has a first through fourth waveguides, first through fourth light scattering portions and firth through fourth delay portions. The first waveguide has a length and a width and is arranged to receive the first light beam, wherein the length is larger than the width. The second waveguide is parallel with the first waveguide. The second waveguide has the length and width and is arranged to receive the second light beam. The third waveguide is disposed perpendicularly to and intersecting with the first waveguide and the second waveguide. The third waveguide has the length and width and is arranged to receive the third light beam. The fourth waveguide is parallel with the third waveguide and is disposed perpendicularly to and intersecting with the first waveguide and the second waveguide. The fourth waveguide has the length and width and is arranged to receive the fourth light beam. The first light scattering portion is disposed at the intersection of the first waveguide and the third waveguide. The first light scattering portion can scatter light into a direction normal to the length of the first waveguide and normal to the length of the third waveguide. The second light scattering portion is disposed at the intersection of the second waveguide and the third waveguide. The second light scattering portion can scatter light into a direction normal to the length of the second waveguide and normal to the length of the third waveguide. The third light scattering portion is disposed at the intersection of the first waveguide and the fourth waveguide. The third light scattering portion can scatter light into a direction normal to the length of the first waveguide and normal to the length of the fourth waveguide. The fourth light scattering portion is disposed at the intersection of the second waveguide and the fourth waveguide. The fourth light scattering portion can scatter light into a direction normal to the length of the second waveguide and normal to the length of the fourth waveguide. The first delay portion can delay the first light beam. The second delay portion can delay the second light beam. The third delay portion can delay the third light beam. The fourth delay portion can delay the fourth light beam. The first delay portion includes a portion of the first waveguide and a first electrode. The second delay portion includes a portion of the second waveguide and a second electrode. The portion of the first waveguide comprises a material having an index of refraction that changes as a function of an electric field therein. The portion of the second waveguide comprises the material having an index of refraction that changes as a function of an electric field therein. The first electrode is operable to provide an electric field in the portion of the first waveguide. The second electrode is operable to provide an electric field in the portion of the second waveguide. The method includes: providing the first light beam, the second light beam, the third light beam and the fourth light beams to the first waveguide, the second waveguide, the third waveguide and the fourth waveguide, respectively, with the same phase; providing a first voltage to the first electrode and the second electrode at a time $t_1$; and providing a second voltage to the first electrode at a time $t_2$, wherein the first voltage is not equal to the second voltage.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 2A-C illustrate the ability of a planar phased array aperture to steer an optical beam.

FIGS. 9A-F illustrate fabrication steps of an example method of creating a planar phased array aperture in accordance with aspects of the present invention.

DETAILED DESCRIPTION

The present invention is drawn to a flat (or conformal) thin plate coherent light phased-array aperture. The aperture includes a rigid or flexible substrate supporting a grid of single-mode optical waveguides fabricated from a material transparent in the operating wavelength. The waveguides are coupled to a single coherent light source and/or detector. An arrangement of phase control regions provides for two-dimensional beam steering by controlling the phase of the light entering the grid. The phase control regions can also be modulated to simultaneously provide atmospheric turbulence modulation for long-range free-space optical communication.

Figure 1:
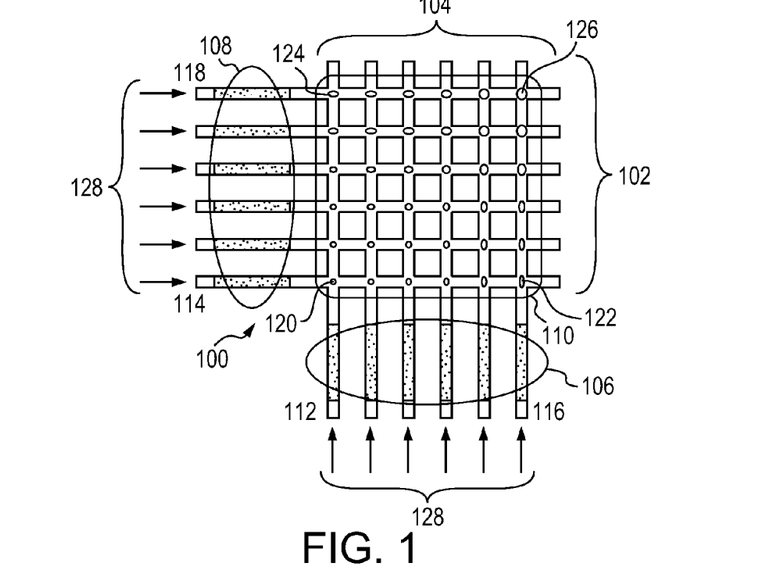
FIG. 1 illustrates an example planar phased array aperture, in accordance with aspects of the present invention.

FIG. 1 illustrates an example planar phased array aperture 100, in accordance with aspects of the present invention.

As illustrated in the figure, planar phased array aperture 100 includes a waveguide array 102, a waveguide array 104, a plurality of delay portions 106, a plurality of delay portions 108 and a plurality of light scattering portions 110. Each of the waveguides within waveguide array 102 and waveguide array 104 are positioned to receive phase locked light beams 128.

Each of the waveguides within waveguide array 102 are parallel with each other, whereas each of the waveguides within waveguide array 104 are parallel with each other. Further, waveguide array 102 and waveguide array 104 are coplanar, such that each of the waveguides within waveguide array 102 intersects with each of the waveguides within waveguide array 104. In this example, each waveguide was a width w and a length l, where l>w, i.e., for the waveguides within waveguide array 102, the length is measured from left to right of the figure and the width is measured from top to bottom of the figure, whereas for the waveguides within waveguide array 104, the width is measured from left to right of the figure and the length is measured from top to bottom of the figure.

Plurality of light scattering portions 110 are disposed at the intersections of waveguide array 102 and waveguide array 104. Further, the properties of each of plurality of light scattering portions 110 is different in order to scatter a predetermined portion of light.

In some embodiments, plurality of light scattering portions 110 are each a different material than that of the surrounding waveguide material, wherein the geometric size of plurality of light scattering portions 110 differs in order to scatter a predetermined portion of light. In some embodiments, plurality of light scattering portions 110 are each a different material than that of the surrounding waveguide material, wherein the geometric shape of plurality of light scattering portions 110 differs in order to scatter a predetermined portion of light.

In some embodiments, plurality of light scattering portions 110 are one of a plurality of materials, each a different material than that of the surrounding waveguide material, wherein the specific material of each of plurality of light scattering portions 110 differs in order to scatter a predetermined portion of light.

In some embodiments, plurality of light scattering portions 110 are each a divot into the substrate (thus extending the surrounding waveguide material down into the substrate), wherein the geometric size of plurality of light scattering portions 110 differs in order to scatter a predetermined portion of light.

In some embodiments, each of plurality of light scattering portions 110 may have a different geometric size, geometric shape or material, wherein the geometric size, geometric shape or material of each of plurality of light scattering portions 110 differs in order to scatter a predetermined portion of light.

For purposes of discussion, a non-limiting example embodiment will be discussed throughout, wherein the dimension of the light scattering portions increases as the distance increases down a particular waveguide. This will be described in greater detail below.

In an example embodiment, the dimension of each of plurality of light scattering portions 110 remains the same in a direction from left to right of the figure with respect to waveguide array 104, whereas the dimension of each of plurality of light scattering portions 110 remains the same in a direction from top to bottom of the figure with respect to waveguide array 102. However, in this example embodiment, the dimension of each of plurality of light scattering portions 110 increases in a direction from left to right of the figure with respect to waveguide array 102, whereas the dimension of each of plurality of light scattering portions 110 decreases in a direction from top to bottom of the figure with respect to waveguide array 104.

For purposes of brevity, take for example four separate scattering portions associated with a waveguide 112 (of waveguide array 104), a waveguide 114 (of waveguide array 102), a waveguide 116 (of waveguide array 104) and a waveguide 118 (of waveguide array 102). A light scattering portion 120 is disposed at the intersection of waveguide 112 and waveguide 114, a light scattering portion 122 is disposed at the intersection of waveguide 116 and waveguide 114, a light scattering portion 124 is disposed at the intersection of waveguide 112 and waveguide 118, a light scattering portion 126 is disposed at the intersection of waveguide 116 and waveguide 118.

In this example embodiment, the dimension of light scattering portion 120 is the same as the dimension of light scattering portion 120 in a direction from left to right of the figure, whereas the dimension of light scattering portion 120 is much less than the dimension of light scattering portion 120 in a direction from top to bottom of the figure. Further, the dimension of light scattering portion 120 is the same as the dimension of light scattering portion 124 in a direction from top to bottom of the figure, whereas the dimension of light scattering portion 120 is much less than the dimension of light scattering portion 124 in a direction from left to right of the figure. The basis for the size variations of plurality of light scattering portions 110 will be described in greater detail below.

In an example embodiment, each of the waveguides of waveguide array 102 and waveguide array 104 are single mode and are fabricated from a linear electro-optic material. Each delay portion (of plurality of delay portions 106 and plurality of delay portions 108) may be any known system or material that is operable to controllably change an optical property of the waveguide, with which it resides. For example, a delay portion may alter the refractive index of the waveguide by any known method, non-limiting examples of which include using an electric field, a magnetic field, and heat. For purposes of discussion, an example embodiment will be used hereinafter, wherein electrodes are used to create a controllable electric field. The electric field alters the refractive index of the waveguide along the length of the electrodes. The change in the refractive index then delays the light transmitted through the waveguide along the delay portion.

The electrodes within a plurality of delay portions 106 and with the plurality of delay portions 108 are long enough (a few millimeters) to provide up to a +π or −π radian phase shift. In an example embodiment, the device substrate is a ground plane, such that voltages applied to the electrodes on top of the waveguides are referenced to the substrate. The applied voltage generates a uniform electric field, perpendicular to the substrate, through the electro-optic material. Each of the waveguides of waveguide array 102 and waveguide array 104 must be far enough apart to ensure that they do not interact substantially over their lengths through evanescent waves, which in practice will result in about a 9-μm center-to-center distance. The width of each waveguide is a few μm. Each of the waveguides of waveguide array 102 and waveguide array 104 fully intersect each other at the crossings, wherein one of plurality of light scattering portions 110 is fabricated onto each waveguide crossing point.

For purposes of this initial discussion, presume that the input light to each of the waveguides of waveguide array 102 and waveguide array 104 is equal in both power and phase. Further, presume that the waveguide spacing is such that when there is no voltage applied to any of the electrodes the main lobe of the output beam from planar phased array aperture 100 is normal to the substrate (thus, each of the waveguides of waveguide array 102 and waveguide array 104 are spaced by an integer multiple of the wavelength of light ($\lambda$) in the waveguide). In order for the main lobe of the output beam to be normal to the substrate, the relative phase of the light emitted from any one of plurality of light scattering portions 110 at each intersection must be the same.

Each one of plurality of light scattering portions 110 scatters light in all directions and is designed to produce a roughly isotropic scattered light profile. With light scattered from each one of plurality of light scattering portions, the constructive and destructive interferences create the beam(s). In an example embodiment, a light scattering portion may be a small divot or lump on the waveguide, of order one-fourth the operating wavelength in one or both dimensions. Each one of plurality of light scattering portions 110 may vary in size and shape across the array, as discussed above, because the fraction of light scattered out of each waveguide at each intersection must be a function of the location in the grid. For example, light scattering portion 120 must scatter an equal small fraction of light from each waveguide. Traveling up waveguide 112, the fraction of light scattered must increase (because the optical power level in waveguide 112 is decreasing), while the fraction scattered from waveguide array 102 must remain constant because each light scattering portion is the first in its row. Similarly, moving rightward through the array along any waveguide of waveguide array 102, the light scattering portions must scatter progressively more from the horizontal waveguide while maintaining a constant scattering ratio out of a waveguide within waveguide array 104. This is accomplished by making the divot or lump used as a scatterer longer in one direction than the other.

Planar phased array aperture 100 is able to steer a beam in two directions, which for purposes of discussion will be describe as lateral and longitudinal. Lateral steering will be described as steering in the plane perpendicular to the substrate and to a vertical line FIG. 1. Longitudinal steering will be described as steering in the plane perpendicular to the substrate and to a horizontal line in FIG. 1. Steering of the beam is accomplished through control of the phase of the radiation in each waveguide as it enters the gridded portion of the array. We first describe device operation assuming the grid is perfectly regular.

The phases of the light in each of the waveguides of waveguide array 102 and waveguide array 104 are equal as they enter. If no voltages are applied to the electrodes, all of the phases are equal entering each of the waveguides of waveguide array 102 and waveguide array 104, and given the multiple of $\lambda$ spacing of each of the waveguides of waveguide array 102 and waveguide array 104, all of the phases are equal at each of plurality of light scattering portions 110. Therefore the scattered light from each of plurality of light scattering portions 110 interferes constructively with the scattered light from the other light scattering portions resulting in a main lobe emitted normal to the surface.

In order to steer the beam, the phases at the inputs to each of the waveguides of waveguide array 102 and waveguide array 104 are varied by applying voltages to the electrodes on top of the waveguides. This will be described in greater detail below with reference to FIGS. 2A-C and FIG. 3.

Figure 2A:
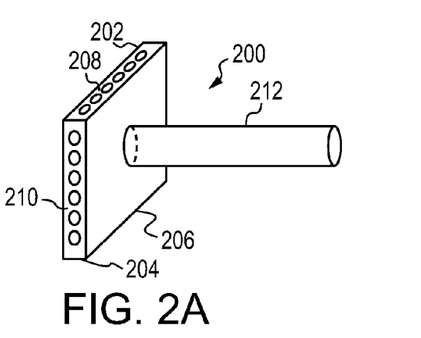
FIG. 2A illustrates the planar phased array aperture generating an optical beam into a direction normal to the plane of the planar phased array aperture.
Figure 2B:
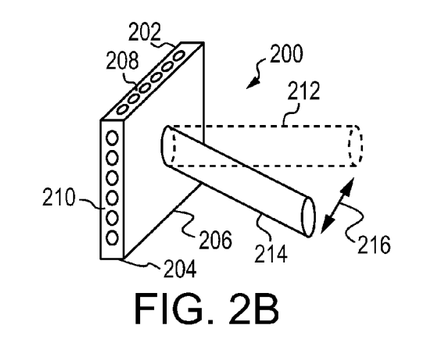
FIG. 2B illustrates the planar phased array aperture steering an optical beam along a first line.
Figure 2C:
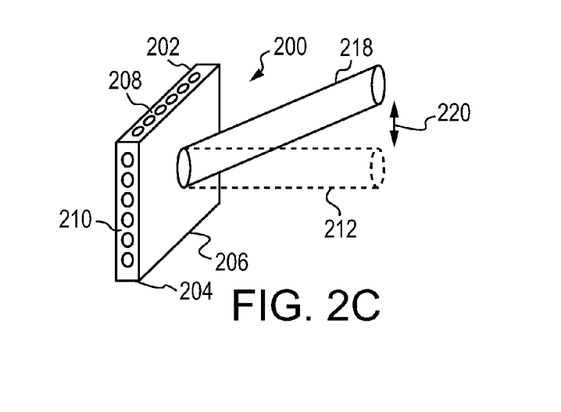
FIG. 2C illustrates the planar phased array aperture steering an optical beam along a second line.

FIGS. 2A-C illustrate the ability of a planar phased array aperture 200 to steer an optical beam.

FIG. 2A illustrates planar phased array aperture 200 generating an optical beam 212 into a direction normal to the plane of planar phased array aperture 100.

It should be noted that optical beam 212 of FIG. 2A (and later described optical beam 214 and optical beam 218) are merely representations of the direction of a main lobe of a created diffraction pattern. As will be described in greater detail below, the constructive and destructive interference of the scattered light from plurality of light scattering portions 110 will create many peaks (lobes). For purposes of explanation, optical beam 212 is represented as the direction of the main lobe of the transmitted beam.

As illustrated in FIG. 2A, phased array aperture 200 includes planar phased array aperture 100 of FIG. 1 and a planar body 202. Planar body 202 has a top surface 204, a side surface 206 and a side surface 208. Planar phased array aperture 100 is disposed within planar body 202, such that waveguide array 102 are arranged to receive light 128 at input ports 210 at top surface 204. Further, planar phased array aperture 100 is disposed within planar body 202, such that waveguide array 104 are arranged to receive light 128 at input ports 212 at side surface 206. In another example embodiment, one coherent light feeds all of the waveguides by splitting to all of the waveguides on the same substrate as planar phased array aperture 100. For example if planar phased array aperture 100 were cut out of planar body 202, then, yes, the waveguides would receive light at the edges. However, in an example embodiment, planar body 202 is fed by one edge-coupled fiber.

By modifying the delay in the light within waveguide array 102 and/or waveguide array 104, planar phased array aperture 200 may steer beam 214. This will be described in greater detail with reference to FIGS. 2B-C and FIG. 3.

FIG. 2B illustrates planar phased array aperture 200 steering an optical beam 212 along a line 216.

Figure 3:
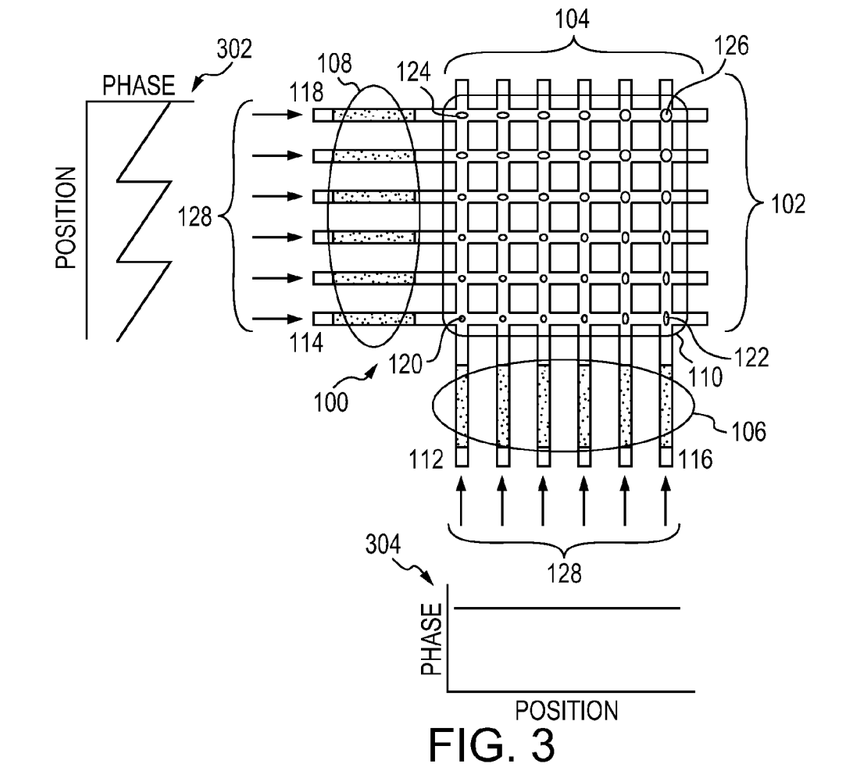
FIG. 3 illustrates a method of driving the delay portions of the planar phased array aperture of FIG. 1, in accordance with aspects of the present invention.

FIG. 3 illustrates a method of driving the delay portions of planar phased array aperture 100 of FIG. 1, in accordance with aspects of the present invention.

As illustrated in FIG. 3, a graph 302 illustrates the driving signal for plurality of delay portions 108, whereas a graph 304 illustrates the driving signal for plurality of delay portions 106. To steer in the longitudinal direction along line 216 as shown in FIG. 2B, a linear phase shift as a function of waveguide position is introduced into the light entering plurality of delay portions 108 by applying voltages to the electrodes therein. Further, a constant voltage is applied to the electrodes within plurality of delay portions 106, thus preventing a phase shift.

FIG. 2C illustrates planar phased array aperture 200 steering an optical beam 212 along a line 220. Although not illustrated in FIG. 3, it is clear that to steer in the lateral direction along line 220, a linear phase shift is introduced into the light entering plurality of delay portions 106 by applying voltages to the electrodes therein. Further, a constant voltage is applied to the electrodes within plurality of delay portions 108, thus preventing a linear phase shift.

A combination of the two approaches leads to a main lobe steered in a combination of directions along line 216 and line 220.

Conventional RF phased array design employs uniform spacing between adjacent rows and columns for a rectangular lattice, and has emitters spaced at a fraction of the wavelength of the radiation. In the optical phased array, however, there is a physical limitation on how close together the light scattering portions can be. The waveguides must be large enough to guide the light with acceptably small losses, and the waveguides must be far enough apart that evanescent modes do not cause appreciable inter-waveguide coupling over the length of the waveguide. In an example embodiment, this results in a center-to-center waveguide distance of around 9 microns. A uniform emitter array with these dimensions would result in a very under-sampled (sub-Nyquist) emitter array, which results in many grating lobes in the far field radiation pattern. This will be described with greater detail with reference to FIG. 4.

Figure 4:
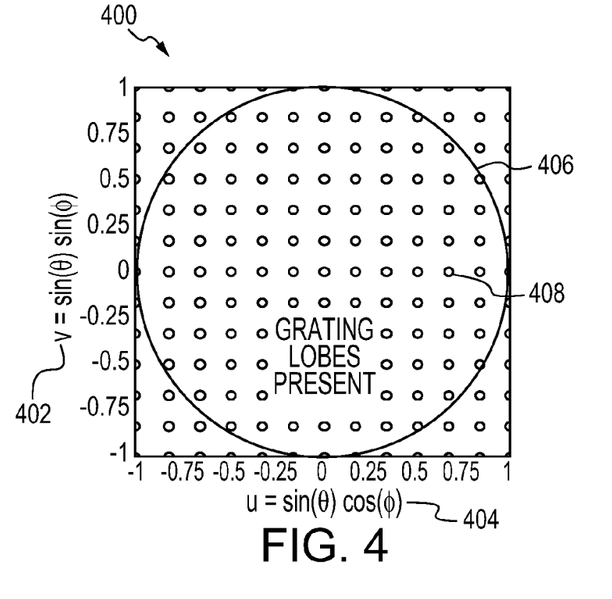
FIG. 4 illustrates an example grating lobe pattern generated by the planar phased array aperture of FIG. 1.

FIG. 4 illustrates an example grating lobe pattern 400 generated by planar phased array aperture 100 of FIG. 1.

As illustrated in FIG. 4, grating lobe pattern 400 is shown on a graph having a y-axis 402 and an x-axis 404. Y-axis 402 represents a $\sin(\theta)\sin(\phi)$, whereas x-axis 404 represents $\sin(\theta)\cos(\phi)$. A plurality of dots 408 represent a plurality of lobes, whereas circle 406 represents a maximum beam steering position of 90 degrees from normal to the plane.

FIG. 4 is an example of a two-dimensional array where the element spacing is on the order of $6\lambda$ and results in a series of grating lobes folding back into the radiation pattern due to aliasing. $\phi$ and $\theta$ in this case are altitude and azimuth, where $\phi$ can be measured from either of the main axes of planar phased array aperture 100.

Grating lobes of this magnitude render an aperture useless for most applications. Firstly, the gain of the aperture is significantly reduced because the aperture must divide its power over multiple beams. Secondly, the radiation pattern now has ambiguous angles of arrival that are difficult to resolve. Both pose serious problems when using the aperture for lidar or communications applications.

One approach that has been successfully employed to create a viable undersampled aperture in RF systems is to randomly spatially distribute the elements over the aperture to break up (or decorrelate) the unwanted grating lobes. Essentially, this spatial randomization allows the undersampled aperture to approximate that of a continuous aperture, which is absent of any spatial aliasing. The result is a smearing of grating lobe power into otherwise quiet angular regions—a tradeoff well worth accepting to significantly suppress the level of the grating lobes at the expense of raising very low sidelobes.

In practice, in the optical phased array, there are physical limitations on the randomization of the array. There is a minimum spacing between the waveguides of around 4 microns to prevent inter-waveguide coupling by evanescent waves. Also, each emitter's position cannot be independently randomized, only the row and column waveguide positions can be randomized, this will be described in greater detail with reference to FIG. 5, later.

While it would be possible to pattern waveguides that meander in order to randomize in both directions, electrodes at the edges of the waveguide could not correctly adjust the phase of such a waveguide in a way that would allow beam steering. These physical limitations do not allow grating lobes to be fully suppressed. Nonetheless, the grating lobes can still be greatly reduced to an acceptable level for some optical applications given the constraints. An example of embodiment wherein the inter array spacings are randomized will now be described with reference to FIGS. 5-8.

Figure 5:
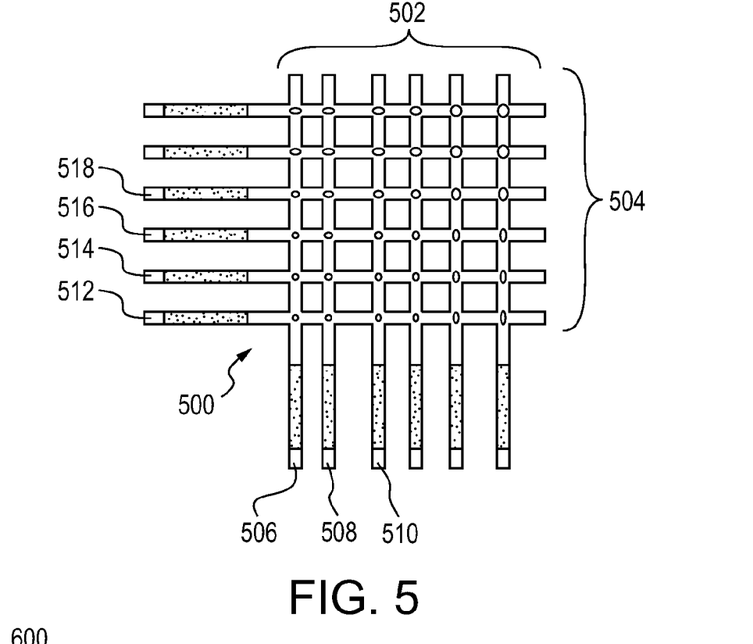
FIG. 5 illustrates another example planar phased array aperture, in accordance with aspects of the present invention.

FIG. 5 illustrates another example planar phased array aperture 500, in accordance with aspects of the present invention.

As illustrated in the figure, planar phased array aperture 500 includes a waveguide array 502 and a waveguide array 504.

Planar phased array aperture 500 is similar to planar phased array aperture 100. However, unlike planar phased array aperture 100, in planar phased array aperture 500 the waveguides within waveguide array 502 are randomly spaced subject to the constraint that no two waveguide have less than 4 microns of space between them, and the waveguides within waveguide array 504 are randomly spaced subject to the constraint that no two waveguide have less than 4 microns of space between them.

For purposes of brevity, take for example a waveguide 506 (of waveguide array 502), a waveguide 508 (of waveguide array 502), a waveguide 510 (of waveguide array 502), a waveguide 512 (of waveguide array 504), a waveguide 514 (of waveguide array 504), a waveguide 516 (of waveguide array 504) and a waveguide 518 (of waveguide array 504). As shown in the figure, the spacing between waveguide 506 and waveguide 508 is less than the spacing between waveguide 508 and waveguide 510. Similarly, the spacing between waveguide 516 and waveguide 514 is less than the spacing between waveguide 518 and waveguide 516, whereas the spacing between waveguide 516 and waveguide 514 is the same as the spacing between waveguide 514 and waveguide 512.

In an example embodiment, presume there exists a –20-dB or smaller sidelobe requirement. A statistical parametric study was conducted of the grating lobe level versus the minimum allowable element distance. Results of the parametric study indicate how close any two randomly placed adjacent rows or columns must be allowed to become if a –20-dB sidelobe requirement is to be achieved. Finally, the relational behavior between the key parameters and sidelobe performance is examined and understood in detail.

A baseline design for planar phased array aperture in accordance with the present invention was provided as a starting point for the pattern feasibility study. The aperture is a 1-cm$^2$ aperture sampled at a $6\lambda$ spacing, where $\lambda$=1.5 microns. The array pattern options included randomized row and column spacing. A limit of 4 microns is applied as the minimum spacing between rows or columns.

A computer simulation of the baseline configuration was constructed using an array modeling software to model the far-field pattern of the 1.2 million element baseline planar phased array aperture (the one with regular waveguide spacing). FIG. 4 provides a graphical illustration of the upper-hemispherical far-field radiation rendered by the computer simulation. As predicted, strong grating lobes show up at $\frac{1}{6}$ intervals in sine space (i.e., ±9.6°, ±19.5°, ±30.0°, ±41.8°, and ±56.4° in azimuth). Each microaperture was modeled as a slot radiator with a uniform illumination to form the element pattern. The full aperture illumination received a 23-dB Taylor weighting in each direction (which is difficult to discern in the elevation plane pattern, given that it is graphically displayed with limited resolution).

A computer simulation was also constructed using the same array modeling software to model the far-field pattern of each randomized row and column optical array, with the objective being to demonstrate the effectiveness of using random column positioning to reduce unwanted grating lobes. However, this time the array modeling software simulation had to make use of a generalized positional perturbation primitive to model the non-uniform longitudinal spacing between the microapertures. It should be pointed out that computing non-uniformly spaced array configurations does require significantly more run time.

Each random row and column optical array can be reduced to an equivalent one-dimensional array simulation given that all microapertures in a given column share the same lateral position. The parametric study was conducted using these equivalent one-dimensional simulations to significantly speed up the run time because the study needs to be conducted over many statistical trials. As a form of validation, results from the equivalent one-dimensional simulation were successfully compared to statistical results from several full-up computer simulations to ensure consistency of the computer models.

The parametric study was conducted for various limits on how close the optical-device designers could potentially fabricate the microapertures in the longitudinal direction, ranging from 3.0 to 6.0 μm for a nominal 1.5-μm coherent light wavelength. The study was statistical in nature because a random draw of column positions yields a single instantiation of a possible random array. Naturally, once the optical array designer selects a particular instantiation, the random array becomes a deterministic design. Nonetheless, the objective of the study is to get a general understanding of how the random column array performs over the ensemble of all possible array instantiations. This will be further described below with reference to FIG. 6.

Figure 6:
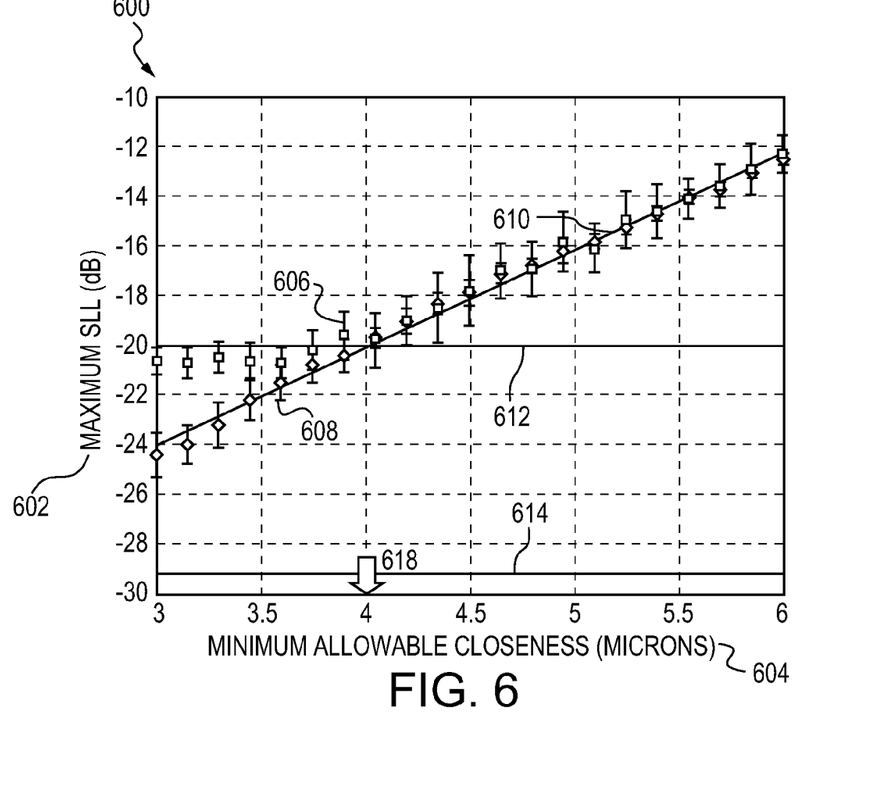
FIG. 6 illustrates a graph of grating lobe level vs. a minimum allowable closeness.

FIG. 6 illustrates a graph 600 of grating lobe level vs. a minimum allowable closeness.

As shown in the figure, graph 600 includes a y-axis 602, and x-axis 604, a plurality of plots 606, a plurality of plots 608, a line 610, a line 612, a line 614 and an arrow 618. Y-axis 602 represents a maximum sidelobe level in dB, whereas x-axis 604 represents a maximum allowable closeness between adjacent waveguides in microns.

Plurality of plots 606 correspond to a 1 cm² aperture case, whereas plurality of plots 608 correspond to a 10 cm² aperture case. Line 610 corresponds to least square fit of plurality of plots 608. Line 612 corresponds to a theoretical peak sidelobe level for a 1 cm² aperture case. Line 614 corresponds to a theoretical peak sidelobe level for a 10 cm² aperture case. Arrow 618 represents a fabrication capability.

The maximum sidelobe level is evaluated for each minimum allowable closeness figure over 20 random column array instantiations and is plotted in FIG. 6 in terms of its mean and standard deviation (i.e., 1σ error bars). Two different array sizes (1×1 cm and 10×10 cm) with the same spacing as the improved design are considered in order to understand the impact of aperture size on the maximum sidelobe level (SLL). Here, the maximum sidelobe level is defined to include the unwanted grating lobe (i.e., a coherent signal) or the peak sidelobe level (i.e., the incoherent portion), whichever of the two is higher. It should be noted that this parametric study does not include the microaperture element factor. That being said, its 1λ width would only provide a slight improvement in the maximum sidelobe level of approximately 0.4 dB.

Inspection of FIG. 6 indicates that the mean grating lobe level is independent of aperture size and approximately follows the least-square fit (found via linear regression):

$$\text{Grating Lobe Level (dB)} = 3.93 \times \text{Minimum Allowable Closeness (μm)} - 35.8. \quad (1)$$

Meanwhile, the incoherent portion of the sidelobes for a random array is statistical in nature and is typically described in terms of a threshold where all sidelobes remain below for some percentage of the time. The following known theoretical approximation explicitly relates the probability that all non-coherent sidelobes remain below some threshold to the threshold itself for a randomized linear array:

$$P(r^2 \leq r_{PK}^2) \cong 1 - \frac{L}{\lambda} \exp(-r_{PK}^2 N_E) \quad (2)$$

where

L=length of array, $N_E$=number of elements in the linear dimension, and $r_{PK}$=peak sidelobe level (taken as the threshold that all sidelobes remain below some percentage of the time).

The linear array form of Equation (2) may be used because the random column optical arrays can be reduced to an equivalent one-dimensional array because all microapertures in a column share the same lateral position. If the $90^{th}$ percentile (90 percent) threshold is designated as a theoretical peak sidelobe level, the approximation in Equation (2) yields a peak sidelobe level of −20 dB and −29.2 dB for the 1×1 cm and 10×10 cm, random column position optical arrays, respectively.

For those 1×1 cm array configurations where the randomized columns are allowed to get closer than 4 μm, FIG. 6 indicates that the maximum sidelobe level bottoms out at approximately −20.5 dB (not far from the −20-dB figure was estimated by theory). This is the point at which the level of the coherent grating lobe falls below the peak sidelobe level.

Regarding the 10×10 cm aperture, the least-square fit in Equation (1) can be used to extrapolate the minimum allowable closeness point at which the grating lobe and the peak sidelobe level are approximately the same. The arithmetic using Equations (1) and (2) indicates that this bottoming-out condition will occur for the 10×10 cm aperture when the minimum allowable closeness is approximately 1.7 μm.

A result from this investigation is that the severely undersampled aperture of the optical array can be transformed into a viable phased-array aperture by employing a randomized column and row approach to break up the grating lobes. However, a minimum allowable closeness of 4.0 μm between the columns and rows in the hardware design should be achieved in order to fabricate a design that satisfies the −20-dB sidelobe requirement. This will be described in more detail with reference to FIG. 7.

Figure 7:
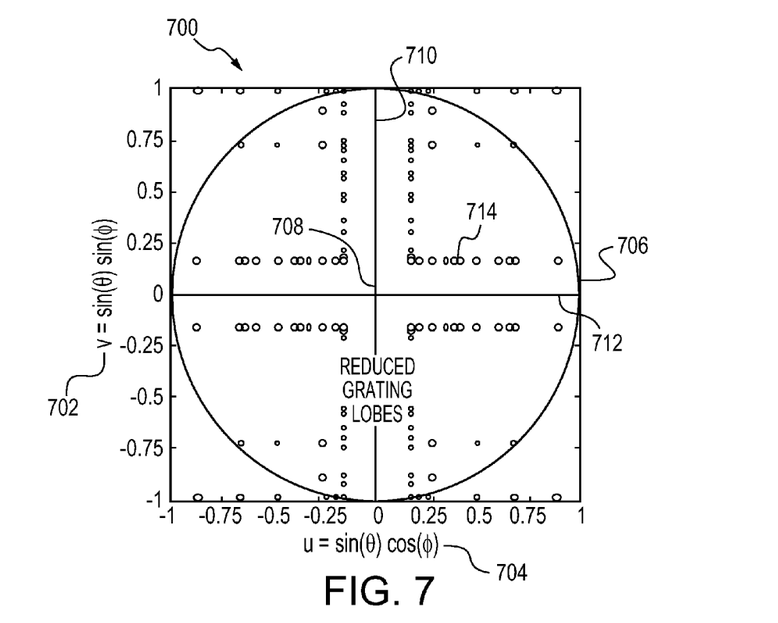
FIG. 7 illustrates an example grating lobe pattern generated by the planar phased array aperture of FIG. 5.

FIG. 7 illustrates an example grating lobe pattern 700 generated by planar phased array aperture 500 of FIG. 5.

As illustrated in FIG. 7, grating lobe pattern 700 is shown on a graph having a y-axis 702 and an x-axis 704. Y-axis 702 represents a function $\sin(\theta)\sin(\phi)$ in radians, whereas x-axis 704 represents $\sin(\theta)\cos(\phi)$ in radians. A dot 708 represent a centered main lobe, a horizontal line of dots 712 represent a type of secondary lobes, a vertical line of dots 710 represent another type of secondary lobes, and the remaining dots 714 represent tertiary lobes. Circle 706 represents a maximum beam steering position.

As seen in FIG. 7, the distribution of grating lobes of a 1×1 cm planar phased array aperture 500, much reduced compared to the results in FIG. 4, when the row and column positions are randomized, with a lower limit on the spacing between any two rows or columns of 4 microns. Note that the amplitude of the main lobe, dot 708, is 40 dB. Thus the sidelobe suppression is much better than 20 dB below the main lobe for most of the area.

Figure 8:
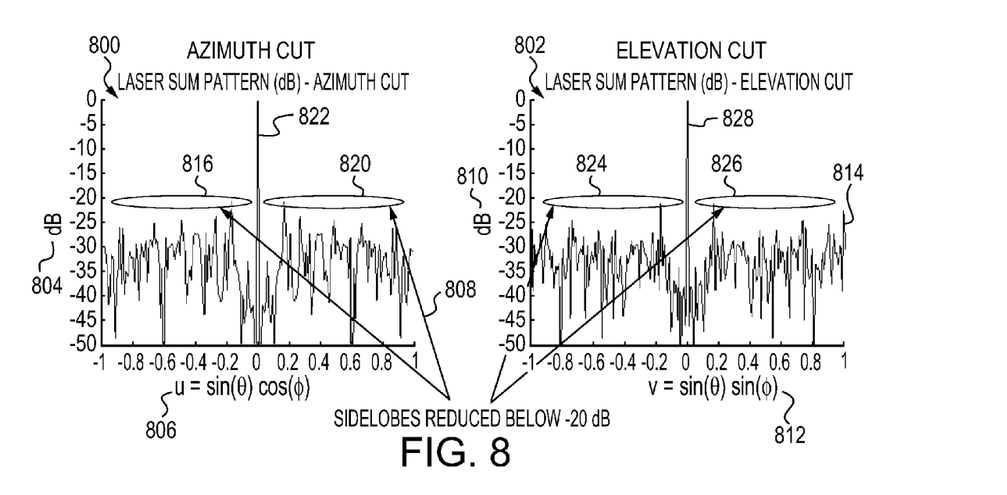
FIG. 8 illustrates graphs explaining principal cuts of example planar phased array aperture 500 of FIG. 5.

FIG. 8 illustrates graphs explaining principal cuts of an example planar phased array aperture 500 of FIG. 5

As illustrated in FIG. 8, a graph 800 represents an azimuth cut, whereas a graph 802 represents an elevation cut. Graph 800 includes a y-axis 804, an x-axis 806 and a function 808. Function 808 has a centered spike 822 and lower portions represented by circles 816 and 820. Graph 802 includes a y-axis 810, an x-axis 812 and a function 814. Function 814 has a centered spike 828 and lower portions represented by circles 824 and 826. As seen in both graphs 800 and 802, the center lobe (centered spike 822 of graph 800 and centered spike 828 of graph 802) is 20 dB greater than the surrounding sidelobes. The center lobe of FIG. 8 corresponds to the main lobe, dot 708, of FIG. 7.

In long-range, high-bandwidth, free-space optical communications systems, it is desirable to be able to correct the beam for atmospheric distortion, which in a phased-array system would require small changes in the phase across the array. This is easily accomplished with a planar phased array aperture in accordance with aspects of the present invention by adjusting the voltages on the electrodes to effectively shape the wavefront coming out of the device. Because there are 2N electrodes controlling an N×N array, there may not be full freedom to control the phase arbitrarily at each light scattering portion. Nevertheless, by applying a voltage variation across the electrodes in addition to the voltages required for steering, much more wavefront shaping can be accomplished than with currently deployed free-space adaptive optics systems, which typically have around a 12×12 array of zones that can be adjusted.

As discussed above, an assumption is made that the phase and intensity of light in each waveguide feeding the planar phased array aperture in accordance with aspects of the present invention was equal. In order to feed a planar phased array aperture from a single coherent light source, the beam will need to be split into thousands of separate waveguides without losing coherence or phase, and with good efficiency. Optical multi-mode interference devices have demonstrated ability to do this. There are many known multimode interference (MMI) devices that allow a single mode waveguide to be coupled into a number of other single mode waveguides, with the flexibility to design in almost arbitrary power splitting ratios among the output waveguides. Such devices have been demonstrated in both crystalline and polymeric materials, and their loss per unit length is significantly smaller than that of either the input or output single-mode waveguides that feed the MMI splitter. Thus, the design considerations in implementing them primarily involve the area they occupy on the substrate.

A simple analysis based on the basic MMI equations demonstrates that the area on the substrate taken by the splitters and feed waveguides will be small relative to the planar phased array aperture itself. The length (L) of a MMI is:

$$L = \frac{W^2}{\lambda_o N}, \tag{3}$$

where W is the MMI width and N is the number of output waveguides. The output waveguide period (p) is p=W/N. This sets a limit on W, since the waveguides must be spaced by at least the lithographic tolerances. For a 1 to 10 waveguide MMI, assuming a total width of 80 microns, the MMI length is just under 500 microns. Three stages of 1 to 10 splitting yield 1000 waveguides, with a total of 111 splitters which take up 0.0004 cm$^2$ of substrate area. Naturally, these MMIs should be connected by waveguides that will take up significantly more area on the surface than the MMIs themselves. For a 1 cm$^2$ aperture, which has 2000 waveguides, 222 splitters are required. Even a crude design, where no attempt at optimization of space is made and the waveguides are simply sequentially split in a pyramidal geometry, the entire series of splitters and connecting waveguides can be accommodated by extending the substrate a few mm in each direction. A 10×10 cm aperture, with 20,000 waveguides, requires an extra stage of MMI splitting, for a total of 2222 splitters, but the much larger area of the aperture means that the substrate size will be less than 11×11 cm.

The above discussion considers some general features of a planar phased array aperture in accordance with aspects of the present invention. Such a planar phased array aperture may be fabricated from any electro-optic material that can be patterned by conventional photolithography and etching techniques developed for the microelectronics industry. One non-limiting example of fabrication of a polymeric planar phased array aperture will now be described with reference to FIGS. 9A-F.

FIGS. 9A-F illustrate fabrication steps of an example method of creating a planar phased array aperture in accordance with aspects of the present invention.

Figure 9A:
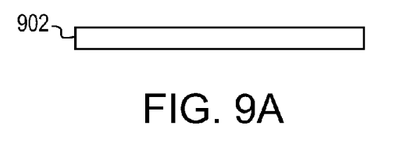
FIG. 9A illustrates a cross-sectional view of a substrate.

FIG. 9A illustrates a cross-sectional view of a substrate 902.

Figure 9B:
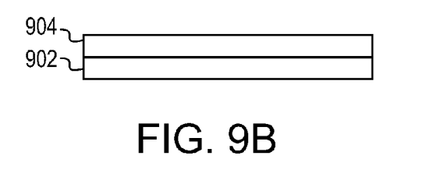
FIG. 9B illustrates a uniform electro-optic polymer layer as deposited onto the substrate.

As shown in FIG. 9B, a uniform electro-optic polymer layer 904 is deposited onto substrate 902. In an example embodiment, this polymer would also be photopatternable, for example PMMA.

Figure 9C:
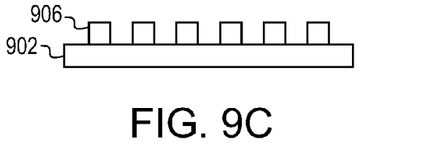
FIG. 9C illustrates uniform electro-optic polymer layer patterned into single-mode waveguides.

Then, as shown in FIG. 9C, uniform electro-optic polymer layer 904 is patterned into single-mode waveguides 906. This patterning may be performed by any known method. The exposed substrate and patterned single-mode waveguides 906 may then be annealed to minimize any defects in the waveguides. This process is optional, and if performed, would vary depending on the material chosen for the waveguides.

Figure 9D:
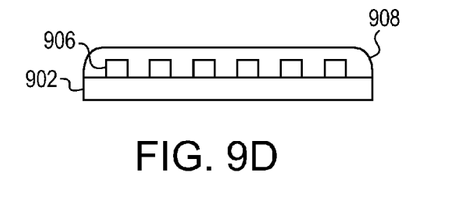
FIG. 9D illustrates another layer being deposited.

As illustrated in FIG. 9D, another layer 908 is then deposited to act as a cladding. This cladding layer 908 will fully fill the trenches and cover the waveguides. Then the top surface is planarized.

Figure 9E:
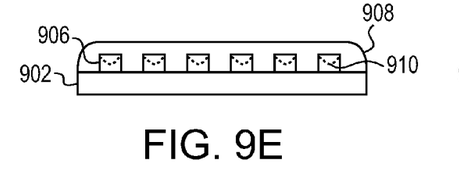
FIG. 9E illustrates light scattering portions being patterned at the grid-line intersections.

At this point, as shown in FIG. 9E, light scattering portions 910 are patterned at the grid-line intersections. In an example embodiment, this may be performed a photolithographic resist soft mask, patterned to expose a region on the waveguide in the shape of the desired light scattering portion. Then an oxygen plasma etch may be used to create a small divot in that region. Other approaches may include a wet etch or deposition of a material on top of the waveguide, which would act as a light scattering portion.

Figure 9F:
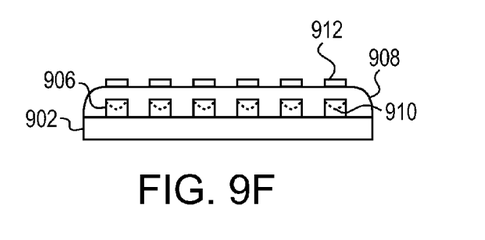
FIG. 9F illustrates electrodes being lithographically patterned onto the now-planar surface.

Finally, as shown in FIG. 9F, electrodes 912 may be lithographically patterned onto the now-planar surface.

An example implementation of a planar phased array aperture in accordance with aspects of the present invention will now be described with reference to FIG. 10.

Figure 10:
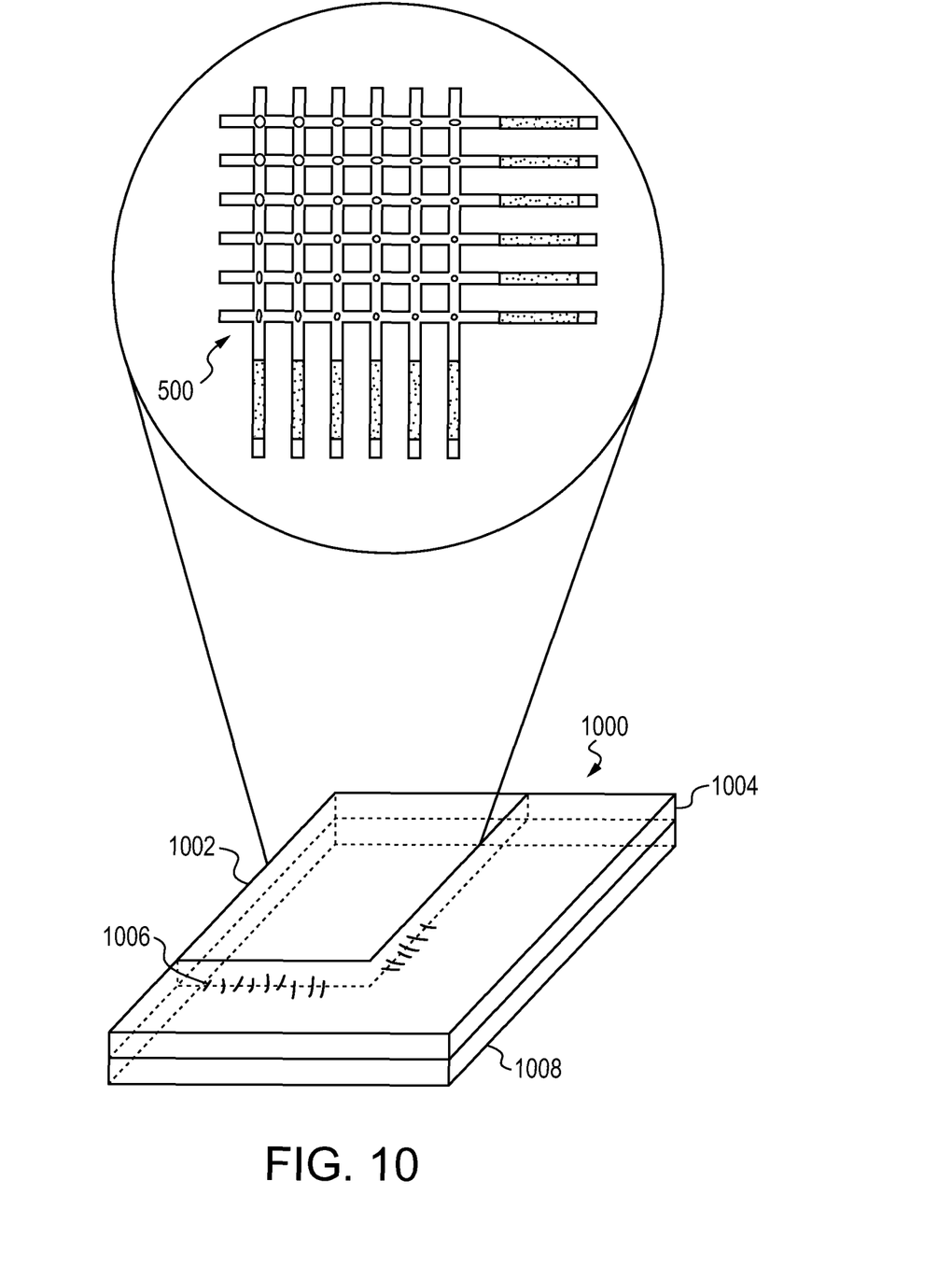
FIG. 10 illustrates an example coherent light steering module in accordance with aspects of the invention.

FIG. 10 illustrates an example coherent light steering module 1000 in accordance with aspects of the present invention.

As illustrated in the figure, coherent light steering module 1000 includes a planar phased array aperture 1002, an optical feed portion 1004, a plurality of steering electrodes 1006 and an integrated circuit 1008. Planar phased array aperture 1002 includes planar phased array aperture 500 of FIG. 5.

Planar phased array aperture 1002 and optical feed portion 1004 are disposed on integrated circuit 1008. Plurality of steering electrodes 1006 are disposed between planar phased array aperture 1002 and integrated circuit 1108. In particular, each of plurality of steering electrodes 1006 is disposed so as to be parallel with a corresponding one of each of the electrodes within planar phased array aperture 500. Optical feed portion 1004 is arranged a cascade of multimode-interference (MMI) splitters (not shown) so as to provide a coherent source of light to each of the waveguides within planar phased array aperture 500.

Integrated circuit 1008 provides voltages to steering electrodes 1006. Steering electrodes interact with corresponding electrodes on planar phased array aperture 500 to generate electric fields within the waveguides. As such, integrated circuit 1008 provides voltages to steering electrodes 1006, which interact with corresponding electrodes on planar phased array aperture 500, for example as discussed above with reference to FIG. 3, to steer the optical beam.

As discussed at length above, scattering occurs at the intersections of planar phased array aperture 500. A ground plane may be established by placing a single, large, L-shaped electrode (not shown) on top of the optical layer over all the steering electrodes.

As mentioned above, the rows and columns of planar phased array aperture 500 are spaced randomly (pseudorandomly) to minimize cross-coupling while providing adequate array element density and sidelobe control. An example embodiment is based on using polymethyl methacrylate as the electro-optic material within the waveguides. This material yields an average waveguide period of 9 μm. For N=1000, this spacing yields a total array size of 9×9 mm. The steering electrodes and MMI splitters occupy about 5 mm in each direction on two sides of planar phased array aperture 500, leading to a face size of about 15×15 mm.

At operating powers and pulse widths, care should be taken to avoid damaging the optical components because of the small mode-field area (MFA) of the waveguides. The fibers connecting the coherent light to the array faces have a MFA of about 80 $\mu m^2$ yielding a fluence of about 2 $J/cm^2$, well below the fiber's damage threshold of about 50 J/cm2. Planar phased array aperture 500 itself is a polymeric electro-optic material, with the input power divided equally among all of the waveguides. In this example embodiment, the cascading splitter network that divides this power was also polymeric. Coupling directly into a single polymer waveguide on each surface would result in a fluence of about 40 $J/cm^2$, far in excess of the polymer's approximate 1-$J/cm^2$ damage threshold. To solve this problem, the optical layer will be composed of multiple materials, with silica waveguides used for the first two stages of the cascading MMI splitter network (to go from 1 to 100 waveguides per side of the array) and polymer used for the last stage of the cascade (to go from 10 to 1000 waveguides) and planar phased array aperture 500 itself.

The patterned silica waveguides will be butt-coupled directly to the polymer waveguides lithographically. All waveguides will be fabricated on the same substrate.

In accordance with the present invention, a thin steerable coherent optical beam is provided without the need for mechanically moving parts. A planar phased array aperture in accordance with aspects of the present invention differs significantly from conventional optical beam steering systems in that it is very thin. Further, by randomly spacing the distance between waveguides, a centered main lobe may be maintained whereas all other lobes are attenuated. The design is inherently capable of atmospheric turbulence correction without any further hardware beyond what is required for non-adaptive phased arrays. Furthermore, the geometry, where the coherent light source is edge-coupled to the substrate via a fiber, allows the device to be used in a range of applications where other phased arrays are impractical, for example on the outer skin of aircraft or vehicles, or for smaller arrays on helmets, backpacks, or clothing. The technology would enable a range of free-space optical communication and LIDAR applications to be realized.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for use with a first light beam, a second light beam, a third light beam and a fourth light beam, said device comprising:
a first waveguide having a length and a width and being arranged to receive the first light beam, the length being larger than the width;
a second waveguide parallel with said first waveguide, said second waveguide having the length and width and being arranged to receive the second light beam;
a third waveguide disposed perpendicularly to and intersecting with said first waveguide and said second waveguide, said third waveguide having the length and width and being arranged to receive the third light beam;
a fourth waveguide parallel with said third waveguide and disposed perpendicularly to and intersecting with said first waveguide and said second waveguide, said fourth waveguide having the length and width and being arranged to receive the fourth light beam;
a first light scattering portion disposed at the intersection of said first waveguide and said third waveguide, said first light scattering portion operable to scatter light;
a second light scattering portion disposed at the intersection of said second waveguide and said third waveguide, said second light scattering portion operable to scatter light;
a third light scattering portion disposed at the intersection of said first waveguide and said fourth waveguide, said third light scattering portion operable to scatter light; and
a fourth light scattering portion disposed at the intersection of said second waveguide and said fourth waveguide, said fourth light scattering portion operable to scatter light,
wherein a dimension of the first, second, third and fourth light scattering portions increases as a distance increases down each respective one of the first, second, third and fourth waveguides.

2. The device of claim 1, further comprising:
a first delay portion operable to delay the first light beam;
a second delay portion operable to delay the second light beam;
a third delay portion operable to delay the third light beam; and
a fourth delay portion operable to delay the fourth light beam.

3. The device of claim 2,
wherein said first delay portion includes a portion of said first waveguide and an electrode,
wherein said portion of said first waveguide comprises a material having an index of refraction that changes as a function of an electric field therein,
wherein said electrode is operable to provide an electric field in said portion of said first waveguide.

4. The device of claim 3, wherein said first waveguide is spaced from said second waveguide and said third waveguide is spaced from said second waveguide such that light scattered from said first light scattering portion constructively and destructively interferes with light scattered from said second light scattering portion, said third light scattering portion and said fourth light scattering portion to create a far-field intensity pattern having a main lobe.

5. The device of claim 4,
wherein said first light scattering portion has a width $w_1$ and a length $l_1$, where width $w_1$ is less than the width of said first waveguide and where length $l_1$ is less than the width of said first waveguide,
wherein said second light scattering portion has width $w_1$ and a length $l_2$, where length $l_2$ is greater than width $w_1$ and where length $l_2$ is less than or equal to the width of said first waveguide,
wherein said third light scattering portion has length $l_1$ and a width $w_1$, and
wherein said fourth light scattering portion has length $l_2$ and a width $w_2$, where width $w_2$ is greater than width $w_1$ and where width $w_2$ is less than or equal to the width of said first waveguide.

6. The device of claim 1, wherein said first waveguide is spaced from said second waveguide and said third waveguide is spaced from said second waveguide such that light scattered from said first light scattering portion constructively and destructively interferes with light scattered from said second light scattering portion, said third light scattering portion and said fourth light scattering portion to create a far-field intensity pattern having a main lobe.

7. The device of claim 6,
wherein said first light scattering portion has a width $w_1$ and a length $l_1$, where width $w_1$ is less than the width of said first waveguide and where length $l_1$ is less than the width of said first waveguide,
wherein said second light scattering portion has width $w_1$ and a length $l_2$, where length $l_2$ is greater than width $w_1$ and where length $l_2$ is less than or equal to the width of said first waveguide,
wherein said third light scattering portion has length $l_1$ and a width $w_1$, and
wherein said fourth light scattering portion has length $l_2$ and a width $w_2$, where width $w_2$ is greater than width $w_1$ and where width $w_2$ is less than or equal to the width of said first waveguide.

8. The device of claim 1,
wherein said first light scattering portion has a physical property enabling said first light scattering portion to scatter a first portion of light;
wherein said second light scattering portion has a physical property enabling said second light scattering portion to scatter a second portion of light;
wherein said third light scattering portion has a physical property enabling said third light scattering portion to scatter a third portion of light, and
wherein said fourth light scattering portion has a physical property enabling said fourth light scattering portion to scatter a fourth portion of light.

9. The device of claim 8,
wherein said first waveguide comprises a first material,
wherein one of said first light scattering portion, said second light scattering portion, said third light scattering portion and said fourth light scattering portion comprises a second material that is different from said first material, and
wherein the physical property is a geometry of said second material.

10. The device of claim 8, further comprising:
a planar substrate having a top surface and comprising a substrate material,
wherein said first waveguide, said second waveguide, said third waveguide and said fourth waveguide are disposed on said top surface,
wherein said first waveguide comprises a first material,
wherein one of said first light scattering portion, said second light scattering portion, said third light scattering portion and said fourth light scattering portion comprises a divot into said planar substrate such that the first material fills the divot, and
wherein the physical property is a geometry of a second material.

11. The device of claim 1,
wherein said first light scattering portion has a width $w_1$ and a length $l_1$, where width $w_1$ is less than the width of said first waveguide and where length $l_1$ is less than the width of said first waveguide,
wherein said second light scattering portion has width $w_1$ and a length $l_2$, where length $l_2$ is greater than width $w_1$ and where length $l_2$ is less than or equal to the width of said first waveguide,
wherein said third light scattering portion has length $l_1$ and a width $w_1$, and
wherein said fourth light scattering portion has length $l_2$ and a width $w_2$, where width $w_2$ is greater than width $w_1$ and where width $w_2$ is less than or equal to the width of said first waveguide.

12. A device for use with a first light beam, a second light beam, a third light beam, a fourth light beam, a fifth light beam and a sixth light beam, said device comprising:
a first waveguide having a length and a width and being arranged to receive the first light beam, the length being larger than the width;
a second waveguide parallel with said first waveguide, said second waveguide having the length and width and being arranged to receive the second light beam;
a third waveguide parallel with said first waveguide, said third waveguide having the length and width and being arranged to receive the third light beam;
a fourth waveguide disposed perpendicularly to and intersecting with said first waveguide, said second waveguide and said third waveguide, said fourth waveguide having the length and width and being arranged to receive the fourth light beam;
a fifth waveguide parallel with said fourth waveguide and disposed perpendicularly to and intersecting with said first waveguide, said second waveguide and said third waveguide, said fifth waveguide having the length and width and being arranged to receive the fifth light beam;
a sixth waveguide parallel with said fifth waveguide and disposed perpendicularly to and intersecting with said first waveguide, said second waveguide and said third waveguide, said sixth waveguide having the length and width and being arranged to receive the sixth light beam;
a first light scattering portion disposed at the intersection of said first waveguide and said fourth waveguide, said first light scattering portion operable to scatter light;
a second light scattering portion disposed at the intersection of said second waveguide and said fourth waveguide, said second light scattering portion operable to scatter light;
a third light scattering portion disposed at the intersection of said third waveguide and said fourth waveguide, said third light scattering portion operable to scatter light;
a fourth light scattering portion disposed at the intersection of said first waveguide and said fifth waveguide, said fourth light scattering portion operable to scatter light;
a fifth light scattering portion disposed at the intersection of said second waveguide and said fifth waveguide, said fifth light scattering portion operable to scatter light;

a sixth light scattering portion disposed at the intersection of said third waveguide and said fifth waveguide, said sixth light scattering portion operable to scatter light;
a seventh light scattering portion disposed at the intersection of said first waveguide and said sixth waveguide, said seventh light scattering portion operable to scatter light;
an eighth light scattering portion disposed at the intersection of said second waveguide and said sixth waveguide, said eighth light scattering portion operable to scatter light; and
a ninth light scattering portion disposed at the intersection of said third waveguide and said sixth waveguide, said ninth light scattering portion operable to scatter light,
wherein said first waveguide is spaced from said second waveguide by a first distance $d_1$,
wherein said third waveguide is spaced from said second waveguide by a second distance $d_2$, where $d_1 \neq d_2$.

13. The device of claim 12, further comprising:
a first delay portion operable to delay the first light beam;
a second delay portion operable to delay the second light beam;
a third delay portion operable to delay the third light beam;
a fourth delay portion operable to delay the fourth light beam;
a fifth delay portion operable to delay the fifth light beam; and
a sixth delay portion operable to delay the sixth light beam.

14. The device of claim 13,
wherein said first delay portion includes a portion of said first waveguide and an electrode,
wherein said portion of said first waveguide comprises a material having an index of refraction that changes as a function of an electric field therein,
wherein said electrode is operable to provide an electric field in said portion of said first waveguide.

15. The device of claim 14,
wherein said first light scattering portion has a width $w_1$ and a length $l_1$, where width $w_1$ is less than the width of said first waveguide and where length $l_1$ is less than the width of said first waveguide,
wherein said second light scattering portion has width $w_1$ and a length $l_2$, where length $l_2$ is greater than width $w_1$ and where length $l_2$ is less than the width of said first waveguide,
wherein said third light scattering portion has width $w_1$ and a length $l_3$, where length $l_3$ is greater than length $l_2$ and is less than or equal to the width of said first waveguide,
wherein said fourth light scattering portion has a width $w_2$ and length $l_1$, where width $w_2$ is greater than width $w_1$ and where width $w_2$ is less than the width of said first waveguide,
wherein said fifth light scattering portion has width $w_2$ and length $l_2$,
wherein said sixth light scattering portion has width $w_2$ and length $l_3$,
wherein said seventh light scattering portion has width $w_3$ and length $l_1$,
wherein said eighth light scattering portion has width $w_3$ and length $l_2$, and
wherein said ninth light scattering portion has width $w_3$ and length $l_3$.

16. The device of claim 12,
wherein said first light scattering portion has a width $w_1$ and a length $l_1$, where width $w_1$ is less than the width of said first waveguide and where length $l_1$ is less than the width of said first waveguide,
wherein said second light scattering portion has width $w_1$ and a length $l_2$, where length $l_2$ is greater than width $w_1$ and where length $l_2$ is less than the width of said first waveguide,
wherein said third light scattering portion has width $w_1$ and a length $l_3$, where length $l_3$ is greater than length $w_2$ and is less than or equal to the width of said first waveguide,
wherein said fourth light scattering portion has a width $w_2$ and length $l_1$, where width $w_2$ is greater than width $w_1$ and where width $w_2$ is less than the width of said first waveguide,
wherein said fifth light scattering portion has width $w_2$ and length $l_2$,
wherein said sixth light scattering portion has width $w_2$ and length $l_3$,
wherein said seventh light scattering portion has width $w_3$ and length $l_1$,
wherein said eighth light scattering portion has width $w_3$ and length $l_2$, and
wherein said ninth light scattering portion has width $w_3$ and length $l_3$.

17. A method of driving a device arranged to receive a first light beam, a second light beam, a third light beam and a fourth light beam, the device having a first waveguide, a second waveguide, a third waveguide, a fourth waveguide, a first light scattering portion, a second light scattering portion, a third light scattering portion, a fourth light scattering portion, a first delay portion, a second delay portion, and a third delay portion, the first waveguide having a length and a width and being arranged to receive the first light beam, the length being larger than the width, the second waveguide being parallel with the first waveguide, the second waveguide having the length and width and being arranged to receive the second light beam, the third waveguide being disposed perpendicularly to and intersecting with the first waveguide and the second waveguide, the third waveguide having the length and width and being arranged to receive the third light beam, the fourth waveguide being parallel with the third waveguide and disposed perpendicularly to and intersecting with the first waveguide and the second waveguide, the fourth waveguide having the length and width and being arranged to receive the fourth light beam, the first light scattering portion being disposed at the intersection of the first waveguide and the third waveguide, the first light scattering portion being operable to scatter light, the second light scattering portion being disposed at the intersection of the second waveguide and the third waveguide, the second light scattering portion being operable to scatter light, the third light scattering portion being disposed at the intersection of the first waveguide and the fourth waveguide, the third light scattering portion being operable to scatter light, the fourth light scattering portion being disposed at the intersection of the second waveguide and the fourth waveguide, the fourth light scattering portion being operable to scatter light, the first delay portion being operable to delay the first light beam, the second delay portion being operable to delay the second light beam, the third delay being portion operable to delay the third light beam, the fourth delay portion being operable to delay the fourth light beam, the first delay portion includes a portion of the first waveguide and a first electrode, the second delay portion includes a portion of the second waveguide and a second electrode, the portion of the first waveguide comprises a material having an index of refraction that changes as a function of an electric field therein, the portion of the second waveguide comprises the material having an index of refraction that changes as a function of an electric field therein, the first electrode being operable to provide an electric field in the portion of the first waveguide, the second electrode being operable to provide an electric field in the portion of the second waveguide, said method comprising:

providing the first light beam, the second light beam, the third light beam and the fourth light beams to the first waveguide, the second waveguide, the third waveguide and the fourth waveguide, respectively, with the same phase;

providing a first voltage to the first electrode and the second electrode at a time $t_1$; and     providing a second voltage to the first electrode at a time $t_2$, wherein the first voltage is not equal to the second voltage, and     wherein a dimension of the first, second, third and fourth light scattering portions increases as a distance increases down each respective one of the first, second, third and fourth waveguides.

* * * * *